United States Patent
Huang et al.

(10) Patent No.: US 6,330,528 B1
(45) Date of Patent: Dec. 11, 2001

(54) METHOD OF TERMINATING TEMPORARILY UNSTOPPABLE CODE EXECUTING IN A MULTI-THREADED SIMULATED OPERATING SYSTEM

(75) Inventors: Cheng-Yu Huang, Fremont; Siddhesh Jere, Santa Clara; Jeffrey D. Merrick, Mountain View; Sudesh Saoji, Santa Clara, all of CA (US)

(73) Assignee: Compaq Computer Corp., Houston, TX (US)

( * ) Notice: Subject to any disclaimer, the term of this patent is extended or adjusted under 35 U.S.C. 154(b) by 0 days.

(21) Appl. No.: 09/216,630

(22) Filed: Dec. 16, 1998

(51) Int. Cl.[7] ................. G06F 9/45; G06F 9/44
(52) U.S. Cl. ............... 703/22; 703/21; 703/26; 703/23; 717/4; 714/2; 714/15; 714/28; 714/34
(58) Field of Search ............... 703/21, 22, 23, 703/26; 717/4; 709/100; 714/28, 37, 38, 35, 15, 16, 19

(56) References Cited

U.S. PATENT DOCUMENTS

| | | | |
|---|---|---|---|
| 3,937,938 | * 2/1976 | Matthews | 714/46 |
| 4,819,234 | 4/1989 | Huber | 371/19 |
| 5,613,098 | 3/1997 | Landau et al. | 395/500 |
| 5,666,533 | * 9/1997 | Horiguchi et al. | 709/100 |
| 5,680,584 | 10/1997 | Herdeg et al. | 395/500 |
| 5,717,903 | * 2/1998 | Bonola | 703/23 |
| 5,724,590 | 3/1998 | Goettelmann et al. | 395/707 |
| 5,790,829 | 8/1998 | Flynn | 395/500 |
| 5,819,063 | 10/1998 | Dahl et al. | 395/500 |
| 5,889,957 | * 3/1999 | Ratner et al. | 709/227 |
| 5,896,494 | * 4/1999 | Perugini et al. | 714/27 |
| 5,963,731 | 10/1999 | Sagawa et al. | 395/500 |
| 6,073,157 | * 6/2000 | Horiguchi et al. | 709/100 |
| 6,145,099 | * 11/2000 | Shidou | 714/37 |
| 6,185,555 | * 2/2001 | Sprenger et al. | 707/3 |

\* cited by examiner

*Primary Examiner*—Kevin J. Teska
*Assistant Examiner*—William Thomson
(74) *Attorney, Agent, or Firm*—Leah Sherry; Justin Boyce; Oppenheimer Wolff & Donnelly LLP

(57) ABSTRACT

An operating system is simulated to run in conjunction with a native operating system, allowing processes, particularly multi-threaded processes, originally developed for the simulated operating system to be ported to the environment of the native operating system with a minimum of effort. In their natural environment the processes being ported have the capability of requesting that other processes be terminated. This capability is provided in the simulated system and in a multi-threaded environment of the simulated system. Processes executing in the simulated system, even if multi-threaded, also have the capability of protecting against being stopped when executing critical code.

5 Claims, 3 Drawing Sheets

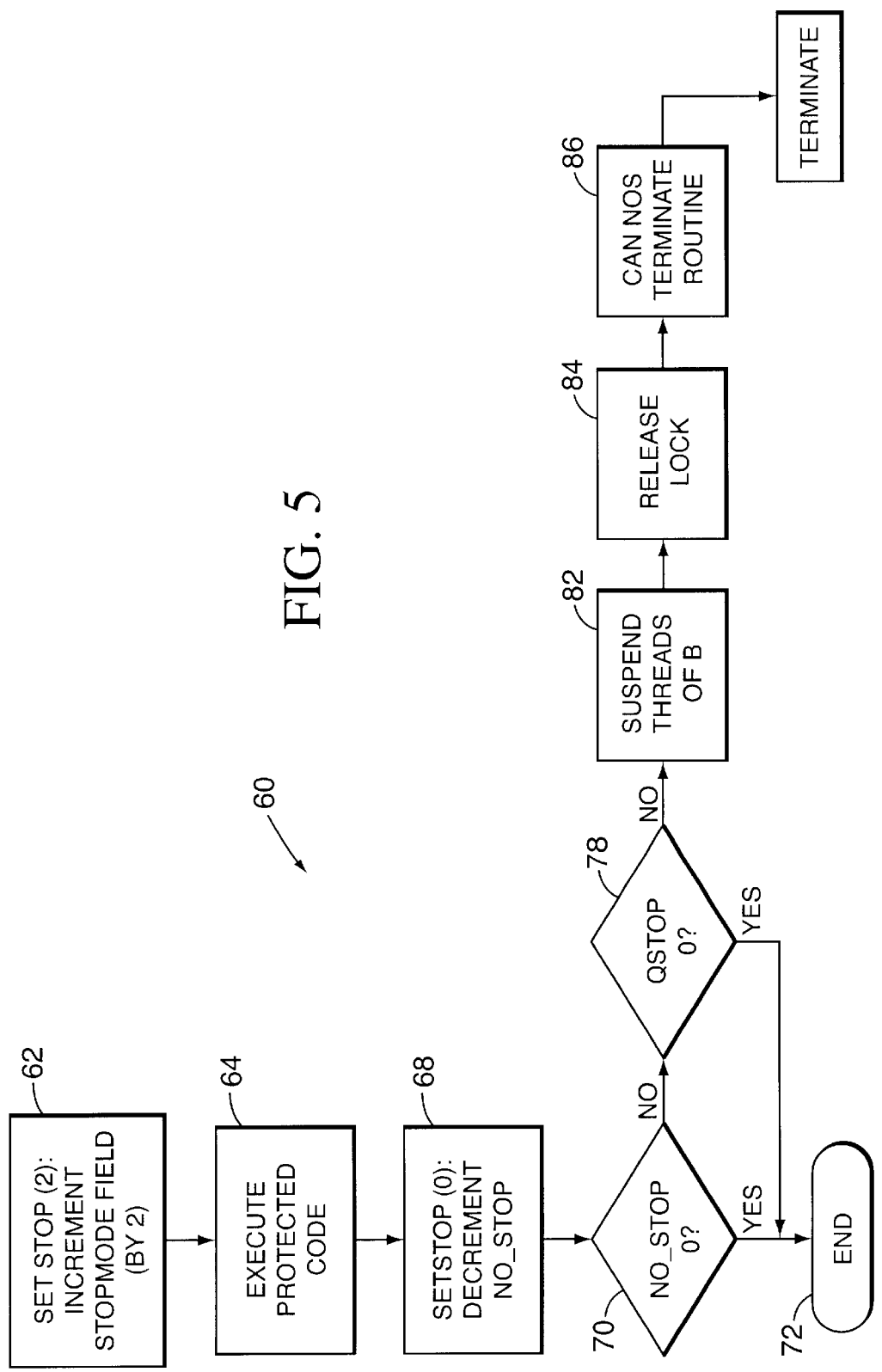

METHOD OF TERMINATING TEMPORARILY UNSTOPPABLE CODE EXECUTING IN A MULTI-THREADED SIMULATED OPERATING SYSTEM

BACKGROUND OF THE INVENTION

The present invention relates generally to computing systems that allow multiprocessing, specifically, the invention relates to a method that allows processes to be terminated by other processes, particularly in multi-threaded environments.

When a number of processes are concurrently executing in a multiple process environment a need can arise to force termination of one or more of those processes. For example, a process may "hang," i.e., experience an error that causes it to halt without terminating, or to enter an endless loop. In such instances it is desirable to end the errant process rather halt all processes and bring down the entire system. Thus, operating system functions are provided that allow a process to terminate another process.

The process need not necessarily be errant. There may also be instances, such as a panic shutdown, to halt or otherwise terminate a process. However, if the process requested or desired to be terminated is, at the time the request or desire is acted upon, performing some system critical operation (e.g., performing a write to (disk) storage), there is a chance that system data or a database or some other data structure can be corrupted. For this reason processes are often given the opportunity to prohibit being stopped until a system critical operation has completed.

When it is wanted to "port" such processes to other environments, problems concerning the capability of allowing a process to stop another process are encountered. Application programs are normally written to create processes that run on specific systems and in conjunction with a specific operating system that performs supervisory control of system resource allocation (e.g., allocation and usage of such system resources as memory, processing time, disk space, peripheral devices, and the like). Use of these processes over time verifies their credibility and operability. The more useful processes become the objects of "porting," i.e., the transfer of the programs to an operating system different from that application originally intended. This will typically require that the application program be rewritten for the new operating system, and if the new operating system is substantially different, or the program language in which the process was originally developed is particularly difficult for the new operating system, the porting task can become a tedious. Such porting procedures can, therefore, be time consuming and expensive, depending upon the process, the structure of the old and new operating systems, and other reasons not necessarily relevant here. For this reason, it may be desirable to simulate the old operating system in the new operating system environment so that the process being ported does not need to be substantially revised—if at all.

However, simulating an operating system in order to allow porting of a process or processors may carry with it additional problems. One such problem concerns the necessary cleanup of system resources (e.g., removal of data structures, deallocation of memory, etc.) obtained by a process while running. For example, normally an operating system controls the "stack" (i.e., that data structure used by the operating system to contain status data for running processes), and the cleanup of a process is done by the process that is terminating by calling a re-entrant routine that uses services of the operating system and its access to the stack. However, when a process has been ported from a foreign operating system environment to run in conjunction with a simulated version of the foreign operating system (hereinafter "Simulated Operating System" or "SOS") the usual cleanup most likely will not be available in the present or "native" operating system on which the Simulated Operating System runs. Also, there may be code in the Simulated Operating System that would be beneficial to use in the Native Operating System environment.

Porting to other operating systems also created problems in connection with process stopping—particularly in distributed and/or multi-thread environments. For example, suppose process A wishes to stop process B. The stop request will be sent to the service of the simulated operating system which will check the stop mode of the target process, process B (i.e., whether it has made itself unstoppable in order that it complete some system critical task). If the check indicates the process is stoppable, the service will spawn a thread that, in turn, will attempt to stop the target process. But, there is a chance that a thread of the target process raises the stop mode of the target process in order to create a system critical task before the service completes its task of stopping the target process. Thus, the target process will either be stopped in the midst of a task, resulting in possible data corruption, or the target process will continue while the process A believes it has stopped.

It can be seen therefore, that a technique for allowing one process, running in a multiprocess and/or, in particular, a multi-threaded environment, to terminate another process even if the process to be terminated is running in an unstoppable mode.

SUMMARY OF THE INVENTION

According to the present invention, processes running in a multiprocess and/or multi-threaded environment are given the power to stop or otherwise terminate other processes, provided the processes to be terminated are stoppable. If the processes to be terminated are not stoppable, a data field will be set so that when a process comes out of it non-stoppable mode, it will check the field to determine if an attempt has been made to terminate it. If so, the process will terminate itself.

In the preferred embodiment of the invention, when a process is created, a data structure ("Process Control Block" or "PCB") is also created and associated with the newly-created process. The PCB contains information concerning the process, and is stored in a common memory shared with other processes. Information kept in this common memory, such as the PCB for each process, is accessible to all processes then (concurrently) executing.

A process' PCB has two integer value fields for implementing the present invention: a StopMode field, and a Qstop field. The StopMode field is set when the corresponding process wishes to make itself unstoppable to protect a critical operation or operations, such as writes to a database. If, while in an unstoppable mode, an attempt to terminate the process is made, that attempt will be noted by setting the Qstop field. When the process completes its (protected) critical task, it will clear the StopMode field and check the Qstop field. If the Qstop field indicates that an attempt has been made to terminate or stop the process, the process will terminate itself.

The invention is preferably implemented in the context of a process that is ported from an operating system environment for which it was originally designed to a different operating system. The porting operation involves simulating the original operating system (hereinafter the "Simulated Operating System" or just "SOS") to run on the new (different) operating system (hereinafter the "Native Operating System" or just "NOS"). The processes ported from the original operating system run in conjunction, and under the supervision, of the SOS in the NOS environment. In addition, the particular NOS used permits not only a multiprocess environment, but a multi-threaded environment, i.e., each process may have a number of concurrent threads executing.

According to the present invention, when a thread is spawned to execute under supervision of the SOS and in the NOS environment, it will increment the StopMode field to enter an unstoppable mode, and decrement the StopMode field when that same thread leaves the unstoppable mode. Requests to stop or terminate a process are processed by the SOS, which will first suspend all threads of the process requested to be terminated, and check the StopMode field. If the StopMode field is not of a predetermined value (e.g., zero), the process is unstoppable, and the SOS will mark the Qstop field. When a thread completes the operation it was protecting by the unstoppable mode, it will decrement the integer value of the StopMode field, check to see if it is of a predetermined value (e.g., zero), and if so, check to see if a request was made to terminate the associated process by examining the Qstop field. If so, the process will perform a termination of itself. If, however, the check of the StopMode field, after decrementation, reveals that the value of that field is not of the predetermined value, the thread will continue normally, knowing that another thread (or threads) of the process are operating in the unstoppable mode, and will ultimately lower the flag so that the process can be stopped.

BRIEF DESCRIPTION OF THE DRAWINGS

FIG. 5 is a flow diagram illustrating the steps taken by a thread of a process to enter and ultimately leave an unstoppable mode of operation.

DESCRIPTION OF THE PREFERRED EMBODIMENT

As mentioned above, the present invention was developed for processes ported from an operating environment different from that on which the processes are now running. The operating system from which processes are being ported is the Non-Stop Kernal operating system available from Tandem Computers Incorporated of Cupertino Calif., who is also the assignee of the invention described and claimed herein. The Native Operating System or NOS used is the Windows NT Operating System (Windows, Windows NT, and NT are trademarks of Microsoft Corporation of Redmond Wash.), although the concepts of the present invention can be used with other native operation systems. The Windows NT operating system is one capable of creating and managing a symmetric multiprocessing environment in which multiple processors can execute multiple code threads simultaneously on the multiple processors. Although a symmetric multiprocessing environment is desired, those skilled in this art will see that the present invention can also be implemented in a asymmetric multiprocessing or even multitasking environment.

Figure 1:
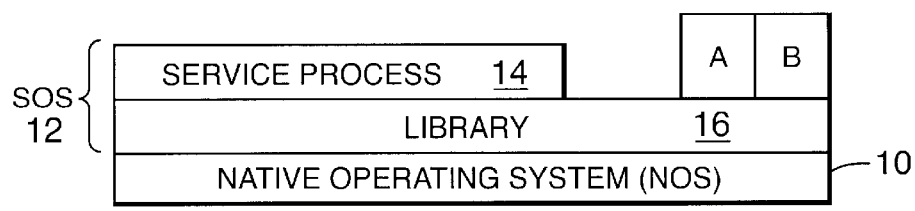
FIG. 1 diagrammatically illustrates the layering used to run a number of ported processes in conjunction with a simulated operating system and associated library, in a native operating system environment.

Turning now to the figures, and for the moment specifically FIG. 1, there is illustrated, in diagrammatic form, the software layering used for simulating a foreign operating system, the SOS, to run in conjunction with a different, native operating system: the NOS. Illustrated in FIG. 1 is the NOS, designated with the reference numeral 10. Here, the NOS 10 is the Windows NT operating system structured to run on a processing entity (not shown). Since the NT operating system is capable of managing a multiprocessing environment, the processing entity used as the hardware platform for the present invention could be one processor, or multiple processors in a symmetric multiprocessing (SMP) architecture, or some other architecture.

The SOS is also illustrated in FIG. 1 and identified with the reference numeral 12. "Ported" processes A and B are shown running on (i.e., under the supervision of) the NOS 10 and in conjunction with the SOS 12. The ported processes A and B are ones that were originally written to run in the operating environment of the SOS when in its original (non-simulated) state. Much of the code used for the processes A and B can be retained, with little or no modification, because the major modifications are made to the SOS 12.

The SOS 12 includes a Service Process 14 and an associated simulated operating system library 16 which includes various dynamic-link libraries (DLLs) used by the SOS 12 and the ported processes A and B. The SOS 12 is structured as just another process running on the NOS 10, and is an equal to the ported processes A and B. Although not specifically shown, it should be understood that other ported processes, as well as processes specifically written for the NOS 10, can and may well be running on the processing entity. Only the ported processes A and B are shown in order to keep from unduly complicating the figures.

Figure 2:
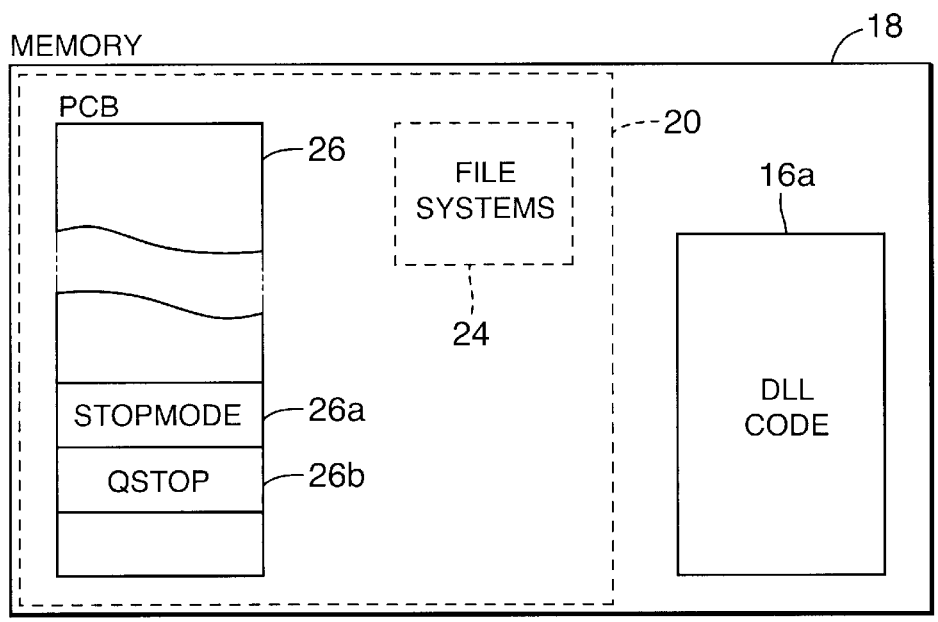
FIG. 2 representatively shows a common memory space in which various data structures are created and maintained for ported processes shown in FIG. 1.

Digressing for the moment, when a process is created to run in the NOS/SOS environment, there will be various resources allocated to and for use by, that process. These resources may include allocation of memory, file systems, creation of various data structures, and the like. Thus, a illustrated in FIG. 2, the processing entity (not shown) on which the NOS runs will include a memory space 18 a portion of which is allocated for a common memory 20 that is available for use by the ported process B. (The ported process A, when created, will have also access to the common memory 20 for its use.) As FIG. 2 also illustrates, the memory space 18 includes the DLL code 16a for the DLLs of the SOS library 16 needed by the ported processes A and B.

The common memory 20 will contain various data structures allocated by the SOS 12 for or used by the ported processes when executing, such as one or more file systems (shown generally at 24) and a process control block (PCB) 26 which will typically contain information about the particular ported process, as well as information that can be used by the ported process (e.g., port addresses of other processes running, etc.). The PCB 26 that is created when the ported process B begins execution is, in fact, a global data structure, accessible by not only the associated process (here, the ported process B), but also by other processes (e.g., the ported process A), the SOS 14, and the NOS 10. Of particular interest to the present invention are two integer value fields contained in the PCB 26: a "StopMode" field 26a, and a Qstop field 26b. The StopMode field 26a, when set to particular states, indicates that the corresponding process, the ported process B, is in an unstoppable mode of operation. In the present invention, the StopMode field 26a will be set to a zero state when the corresponding ported process is in a mode of operation that allows the process to be stopped. Alternatively, any other state but zero will indicate that the process should not be stopped at that time. (It should be evident to those skilled in this art that other value can be used to indicate stoppability and unstoppability.)

The Qstop field 26b is also set to a zero state initially, indicating that there are no outstanding requests that the corresponding ported process B be stopped. Setting the Qstop field 26b to another state (i.e., a non-zero state) is an indication that there is an outstanding request for the ported process B to terminate.

Figure 3:
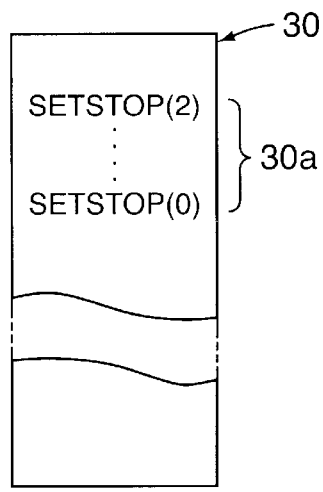
FIG. 3 is a diagrammatic depiction of program code to illustrate entry and egress of an unstoppable mode.

Turning now to FIG. 3, there is illustratively represented the program code 30 for the process B. Program code 30 represents a listing of program instructions, showing in particular the two instructions, SETSTOP(2) and SETSTOP (0) used to establish an unstoppable mode of operation and later to leave that mode, respectively. Between those two instructions would be the program code 30a that is protected by the unstoppable mode which could be, for example, a write operation that, if stopped before complete, may corrupt system data.

Thus, when executing the program code 30 and the SETSTOP(2) instruction is encountered, a call will be made to the DLL of the SOS 12 that, in turn, will cause the StopMode field 26a of the PCB 26 for progress B to be incremented by 2. (Actually, any value can be used to increment the StopMode field 26a; "2" is used for historical reasons.) With the StopMode field 26a in a non-zero state, the ported process B now identified as being in an unstoppable mode. The reason for incrementing the StopMode field flows from the fact that there may be a number of threads running concurrently to realize the execution of the ported process B. There may be more that one of those threads that will need to protect certain operations at the same time and, therefore, be in an unstoppable mode. If the StopMode field were to take on only two states, one identifying the ported process B as being in a stoppable mode, the other to indicate the process B as being in an unstoppable mode, the first of those threads may complete first and reset the StopMode field to a state that indicates that the process is stoppable when, in fact, it is not because the other thread has not completed it protected operation. Thus, the ported process B may be stopped in the middle of a critical operation that could corrupt data or otherwise disrupt the operation of the system.

Returning to FIG. 3, when the operation dictated by the protected code portion 30a has completed, the SETSTOP(0) call will be made, causing the SOS 12 to access the PCB 26 for the ported process B, and decrement the content of the StopMode field 26a.

Figure 4:
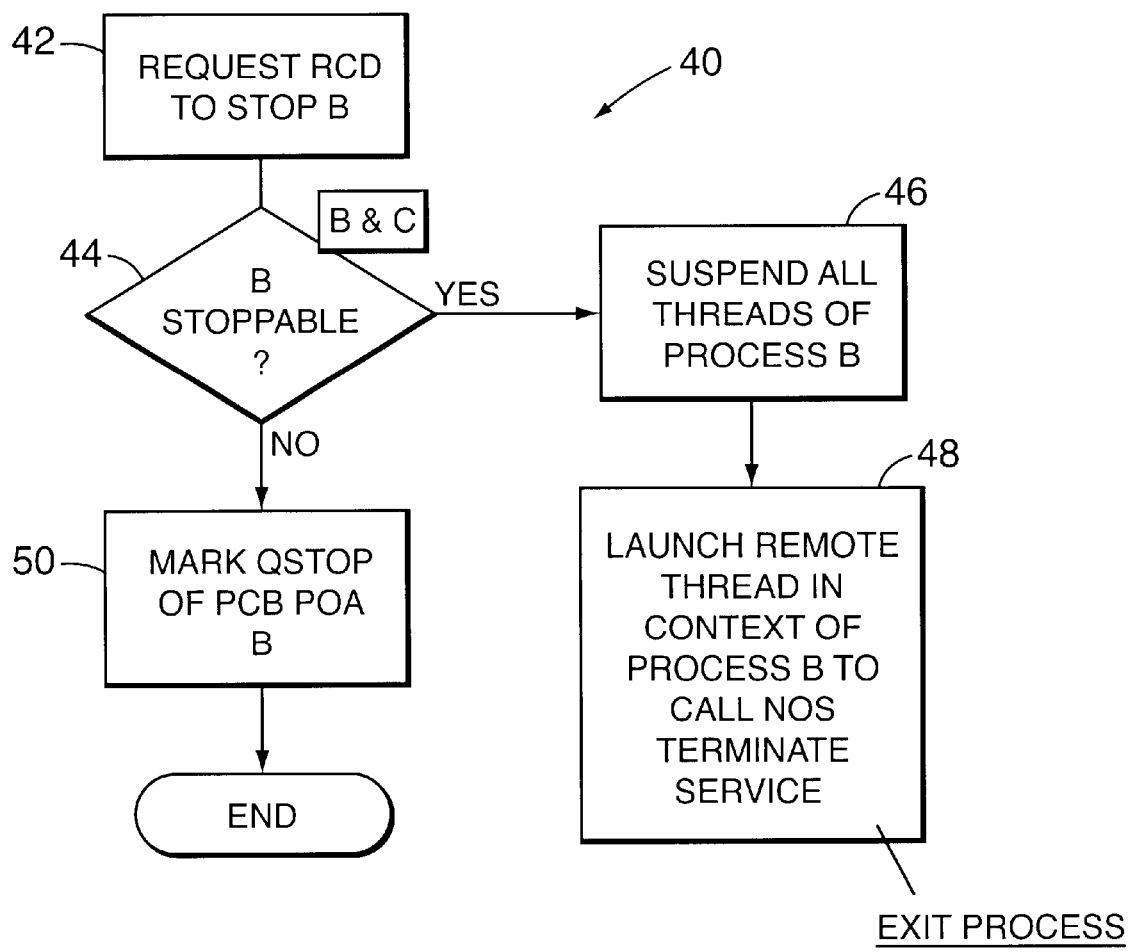
FIG. 4 is a flow diagram that illustrates the steps taken to honor a request, made by one process, to stop another process.

Referring now to FIG. 4, there illustrated are the steps of a procedure 40 taken to stop or terminate a process at the request of another process. Here, the ported process A requests that the ported process B be stopped or terminated. That request, illustrated in step 42, will be formed and messaged to the Service Process 14 (FIG. 1). In response, the Service Process 14, at step 44, will check to see if the process B is stoppable. Accordingly, the Service Process 14 will access the PCB 26 associated with the ported process B to investigate the state of the StopMode field 26a. As indicated above, the PCB 26 is, in essence, a global data structure. As such, it preferably has an associated locking mechanism to provide exclusive access, such as the spin lock mechanism (and function) afforded by the Windows NT operating system. Accordingly, when the SOS Service Process 14 accesses the PCB 26, it will acquire the associated spin lock in order to ensure that the PCB 26 is not changed while being accessed for investigation of the StopMode field 26a.

Continuing with FIG. 3, if the Service Process 14 Stop-Mode field 26a is in its original state, i.e., zero, the step 44 will be exited in favor of the step 46 where all threads of the ported process B then running will be suspended (e.g., by using the Windows NT call to SuspendThread) Information concerning what threads then running is obtained from the PCB 26 which will contain an identification of each thread spawned. Once all threads are suspended, the Service Process 16 will release the spin lock on the PCB 26, and launch a remote thread in the context of the ported process B (e.g., by using the Windows NT CreateRemoteThread function). This will create a new thread in the context of the ported process B whose only purpose is to call another Windows NT function: ExitProcess. The purpose of using the mechanism of the remote thread to call ExitProcess, making it look like the ported process B is making the call, is (1) ExitProcess must be called by the process itself desiring termination, and (2) the ExitProcess call allows use of a DLL_Detach function, allowing use of any DLL main that may exist in the DLL library 16 for any special procedures, for example, needed to cleanup resources allocated the terminated process as described in co-pending patent application Ser. No. 09/541,237 filed herewith. The ported process B will thereby terminate as requested initially by the ported process A.

However, should one or more of threads spawned by the ported process B invoke the unstoppable mode through use of the SetStop(2) call, as described above, prior to the request to terminate the ported process B (or more specifically, prior to the SetStop field being checked), the SetStop field will be a value other than zero, indicating that one or more threads of the ported process B are in an unstoppable mode of operation. Thus, step 44 will be exited in favor of step 50 where the Qstop field will be set to an non-zero value, indicating that a request has been made to terminate the ported process B while it (a thread of the process) was in an unstoppable mode. (If the Qstop field has already been marked, i.e., it is already set to a non-zero state, nothing will be done.) The procedure 40 will then exit at 52.

FIG. 5 illustrates the steps of the procedure used by a ported process, i.e., a thread of the ported process B, to establish and then remove an unstoppable mode. The procedure 60 begins at step 62 with the call to SetStop(2). This, among other things not relevant here, will increment the SetStop field 26a to a non-zero state (if initially zero) or increment the value to the initial state plus 2. The step 62 is followed by a step 64 in which the protected or critical code is execute. This could be a disk write operation or a modification of a data base which, if interrupt before the necessary completion steps (not shown) are taken, could corrupt data or the database or both.

Once the protected code is executed, the thread will call the SetStop(0) function in step 68. This will cause the PCB 26 to be accessed (acquiring first the associated spin lock in order to provide exclusive use of the PCB 26) and the StopMode field decremented. Then, at step 68, the Stop-Mode field is checked. If the value is not zero, meaning that other threads are presently running in an unstoppable mode, the procedure is exited at step 72, and the associated spin lock released.

If, on the other hand, after the StopMode field 26*a* is decremented and found to be zero, the Qstop field is checked at step 78. If that field is found to be zero, the procedure 60 again will end at step 72. However, if the Qstop field is not zero, indicating that the associated process, here ported process B, has been requested to be stopped, step 78 will be exited for step 82 to suspend all threads of the ported process B then running in the manner described above. Then, in step 84, the spin lock is released, and in step a remote thread is launched in the context of the ported process B for the purpose of calling the ExitProcess function, terminating the ported process B.

What is claimed is:

1. In a computing multi-threaded environment that allows a first process to terminate operation of a second process, a method of allowing protected code of the second process to complete before terminating the second process by the first process, the method including the steps of:

associating with the second process a stopmode value and a qstop value, the stopmode value indicating that the second process cannot be terminated when anything other than a first state, and the qstop value indicating that at least one prior attempt has been made to terminate the second process;

incrementing the stopmode value prior to execution of protected code by the second process to indicate that the second process cannot be stopped;

checking the stopmode value at the completion of execution of the protected code, and if the stopmode value is a first state, checking the qstop value;

terminating the second process if the qstop value is not a first predetermined state.

2. The method of claim 1, wherein in response to a request for termination of the second process from the first process the qstop value is changed to a second predetermined state.

3. In a multi-threaded processing environment, a method for allowing a first process terminate execution of a second process only after completion of protected code that includes the steps of:

providing the second process with a stopmode value that, when set to a first value indicates the second process cannot be stopped, and when set to at least a second value indicates that the process can be stopped;

incrementing the stopmode value to the first state prior to execution of protected code by the second process;

terminating the second process if the stopmode value is set to the second state, providing the second process with a qstop value having a first state indicative that a termination of the second process was attempt.

4. The method of claim 3, including the step of the second process exiting execution of the protected code to check the qstop value and if in the first state the second process terminating execution.

5. The method of claim 3, wherein execution of the second process includes spawning one or more threads, each of the one or more threads including protected code.

* * * * *